March 9, 1965 W. C. WATSON 3,172,525
BOARD TRANSFER APPARATUS
Filed Dec. 20, 1962 4 Sheets-Sheet 1
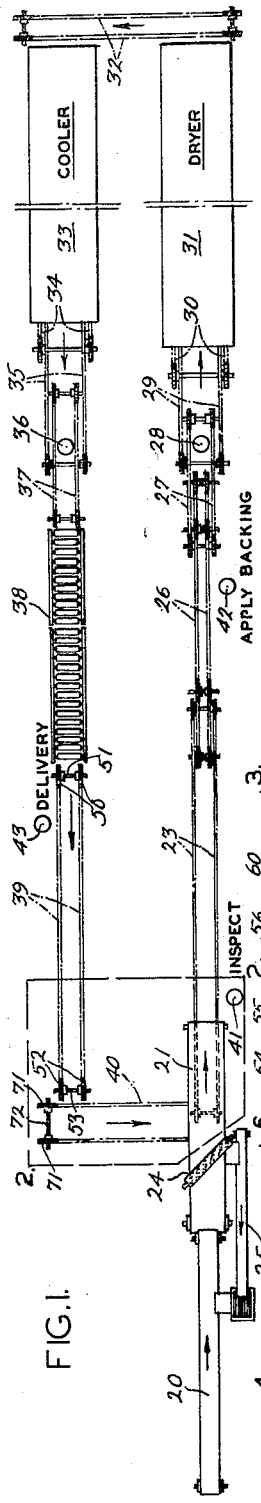
FIG. 1.
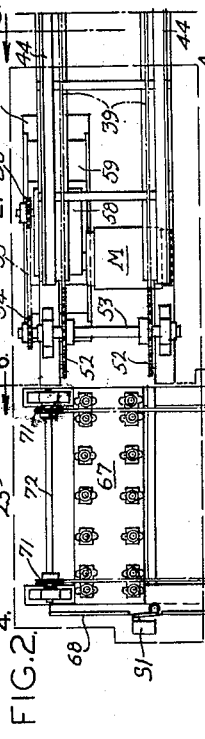
FIG. 2.
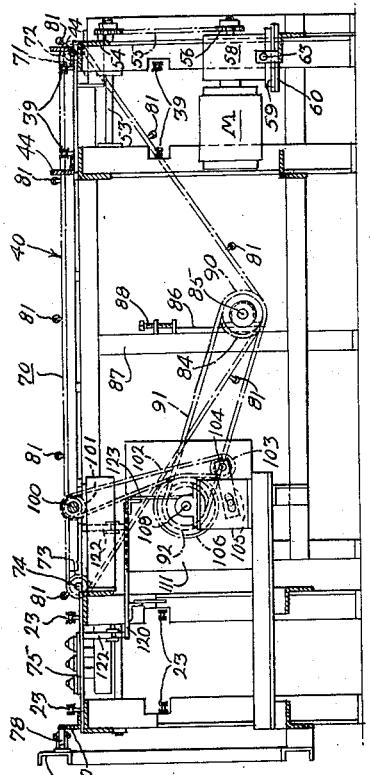
FIG. 3.
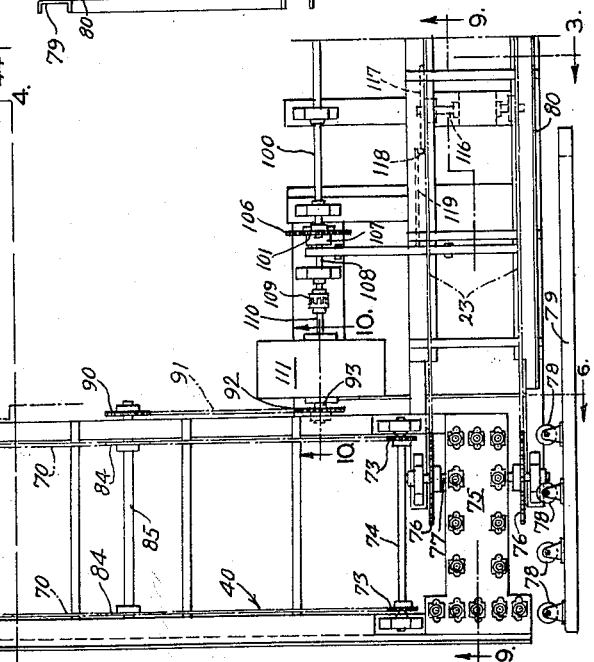
INVENTOR
WAYNE C. WATSON
BY Howson & Howson
ATTYS.

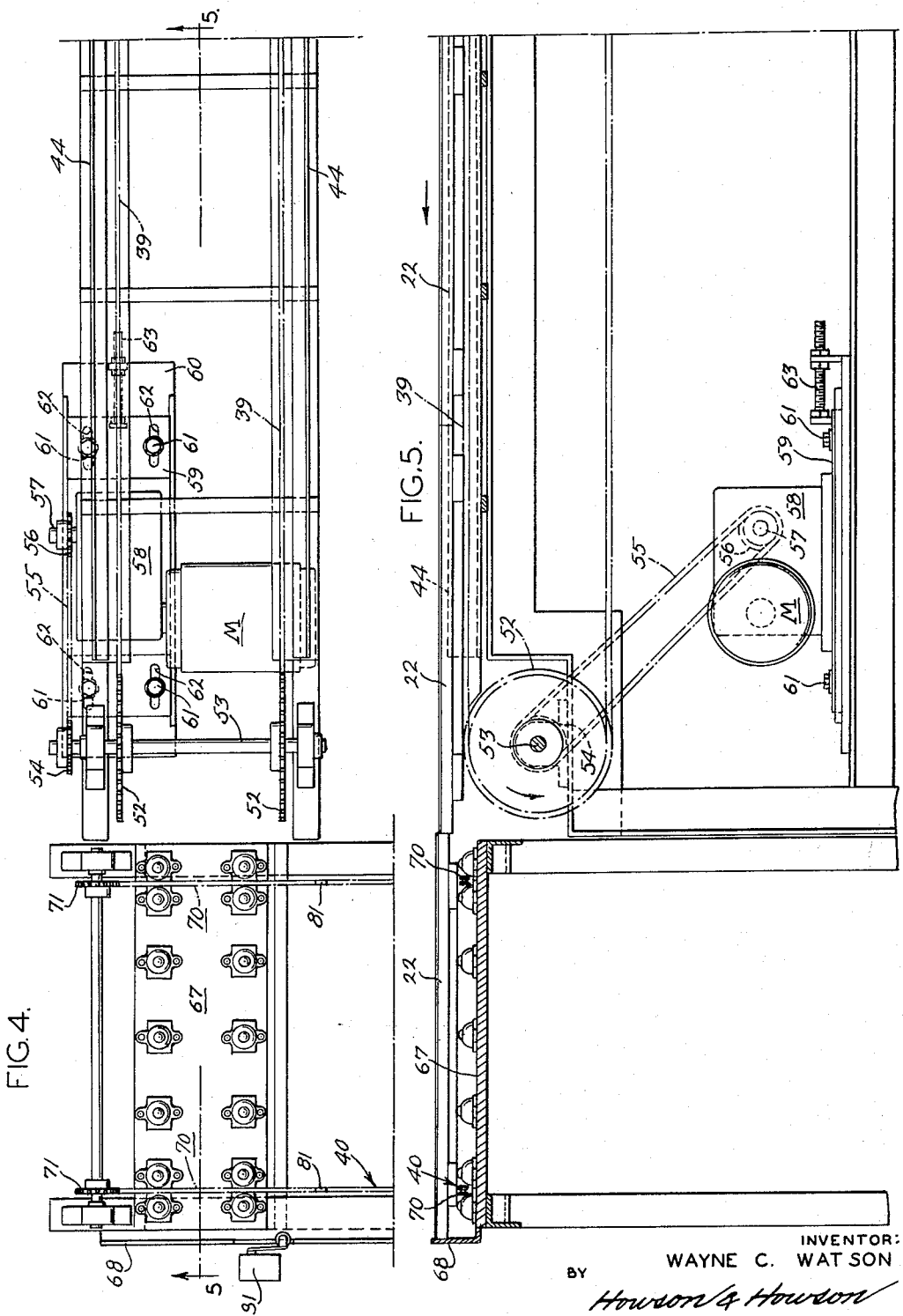

March 9, 1965  W. C. WATSON  3,172,525
BOARD TRANSFER APPARATUS
Filed Dec. 20, 1962  4 Sheets-Sheet 3
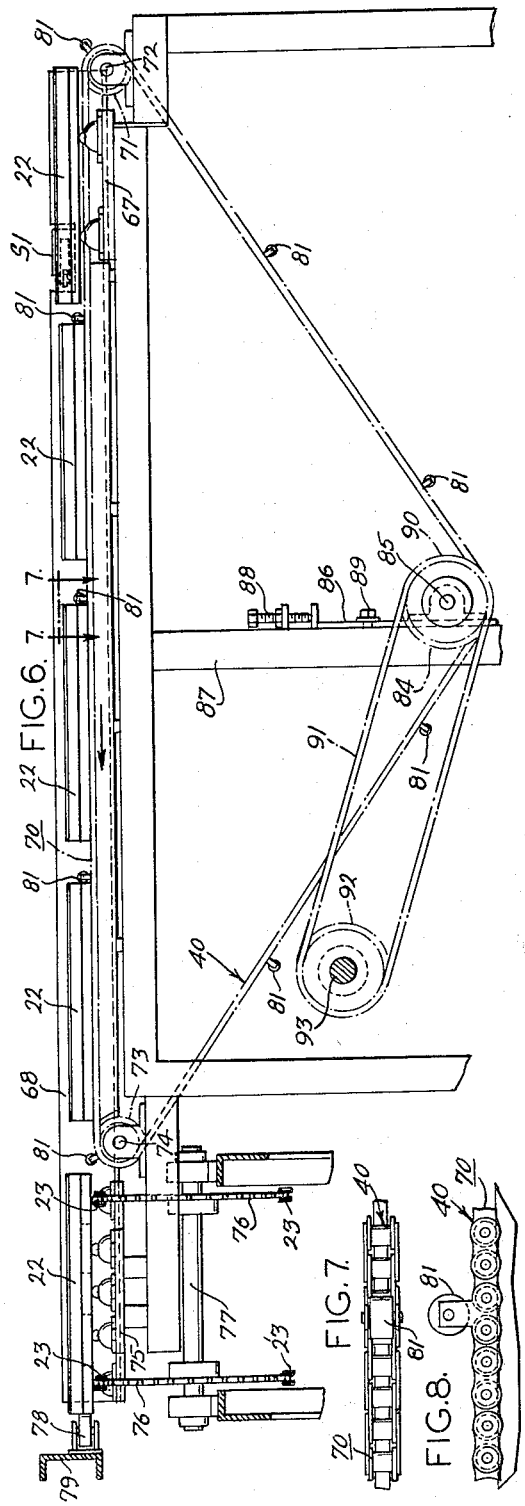
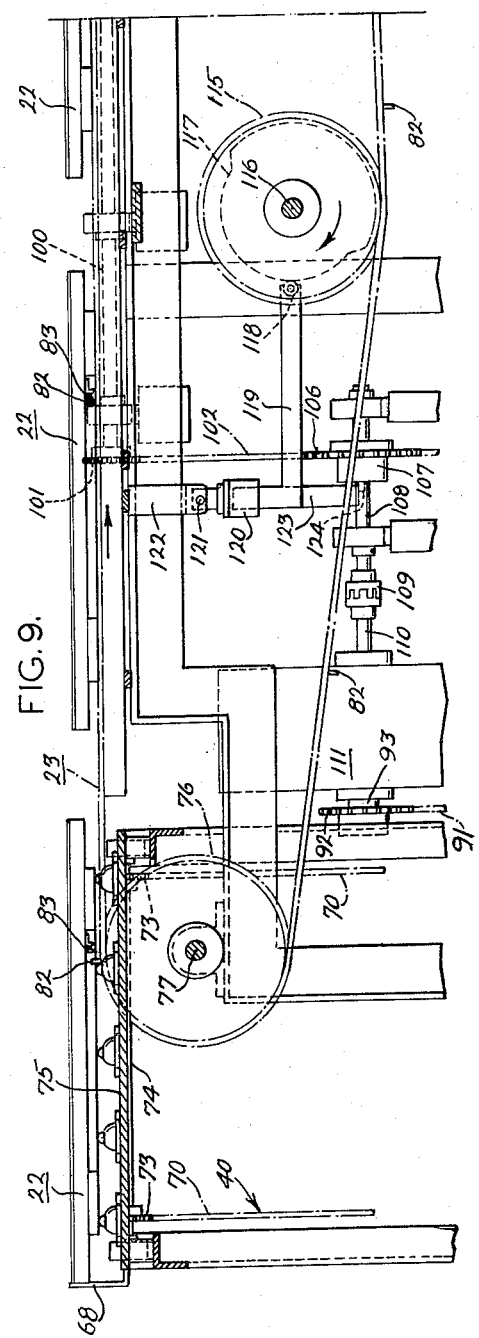
INVENTOR:
WAYNE C. WATSON
BY Howson & Howson
ATTYS.

March 9, 1965 W. C. WATSON 3,172,525
BOARD TRANSFER APPARATUS
Filed Dec. 20, 1962 4 Sheets-Sheet 4

INVENTOR:
WAYNE C. WATSON
BY Howson & Howson
ATTYS.

United States Patent Office 3,172,525
Patented Mar. 9, 1965

3,172,525
BOARD TRANSFER APPARATUS
Wayne C. Watson, Ambler, Pa., assignor to American Encaustic Tiling Company, Inc., Lansdale, Pa., a corporation of New York
Filed Dec. 20, 1962, Ser. No. 246,120
9 Claims. (Cl. 198—34)

This invention relates to board transfer apparatus, particularly for transferring empty tile boards or other acceptable articles from a return or supply conveyor by a cross conveyor to a forwarding conveyor which moves the boards by continuous travel past a filling or tile assembling station, and has for an object the provision of improvements in this art.

In arranging tiles in sheet package form with an adherent tile-holding backing sheet, it is first necessary to arrange tiles in the desired position and then apply the adherent backing sheet. The backing sheet holds the tiles in position until they are laid in a bed of cement and thereafter the backing sheet is removed, as by soaking and scrubbing, and the spaces between tiles filled with grouting material.

One convenient system for arranging tiles is to deposit them in the pockets of a partitioned board or tray, for example, a board having twelve (12) longitudinal rows and twenty-four (24) transverse rows of pockets to hold two hundred and eighty-eight (288) tiles. In a copending application of Malcolm A. Schweiker, Serial No. 225,578, filed September 24, 1962, there is disclosed such a tile holding board and one form of apparatus for assembling tiles on such boards. The apparatus of that application involves the use of a continuously travelling conveyor for engaging depending projections on the boards and moving them past a filling mechanism which deposits tiles in the pockets of the boards as they continuously advance with the conveyor.

The present invention provides board transfer means timed by the movement of the continuously moving board forwarding conveyor of the assembly line for rapidly depositing an empty board on the forwarding conveyor in correct position to be engaged by entraining projections on the forwarding conveyor so that the tile board will proceed past the filling mechanism in exactly the correct position and at exactly the right time to be filled properly.

The invention also provides means for stopping the movement of the board return or supply conveyor when the board receiving space on the cross-conveyor is occupied.

The above and other objects of the invention, as well as various features of novelty and advantages, will be apparent from the following description of an exemplary embodiment, reference being made to the accompanying drawings, wherein:

FIG. 1 is a plan view of a general plant arrangement in which apparatus of the present invention is included;

FIG. 2 is an enlarged plan view of apparatus located in the zone 2—2 of FIG. 1;

FIG. 3 is a vertical transverse section and elevation taken on the line 3—3 of FIG. 2;

FIG. 4 is a further enlarged plan view taken in the zone 4—4 of FIG. 2;

FIG. 5 is a vertical longitudinal section taken on the line 5—5 of FIG. 4;

FIG. 6 is an enlarged vertical transverse section and elevation taken on the line 6—6 of FIG. 2;

FIG. 7 is an enlarged fragmentary plan view taken on the line 7—7 of FIG. 6;

FIG. 8 is a side elevation of parts shown in FIG. 7;

FIG. 9 is an enlarged vertical longitudinal section taken on the line 9—9 of FIG. 2;

Figure 10:
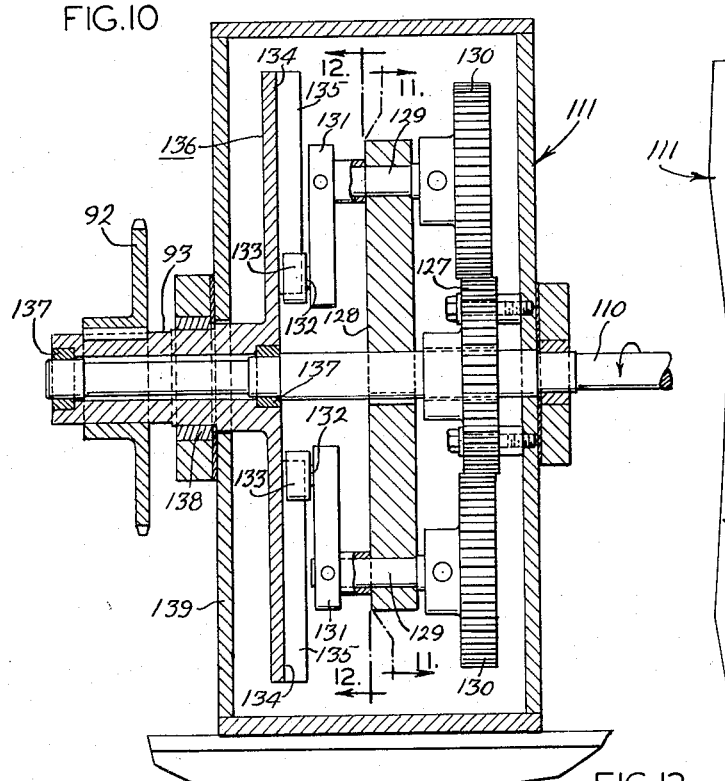
FIG. 10 is an enlarged vertical longitudinal section of a detail, the view being taken on the line 10—10 of FIG. 2.
Figure 11:
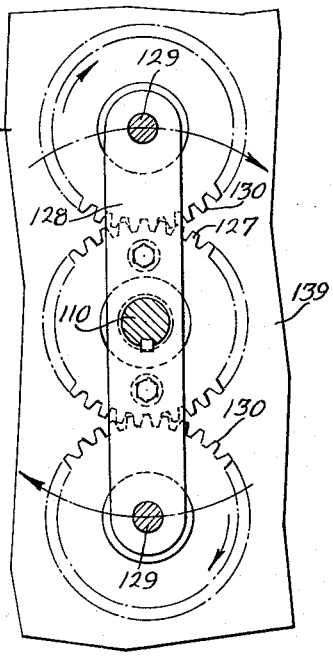
FIG. 11 is a section taken on the line 11—11 of FIG. 10.
Figure 12:
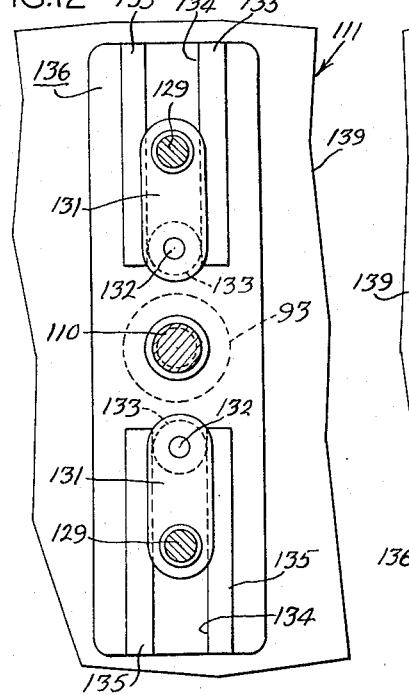
FIG. 12 is a section taken on the line 12—12 of FIG. 10.
Figure 13:
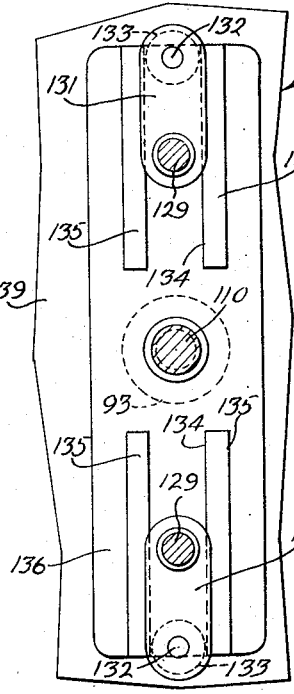
FIG. 13 is a view like FIG. 12 but showing the parts in a different position.

As disclosed in the copending application referred to above, a belt conveyor 20 takes tiles in random arrangement and feeds them to an assembling device 21 which aligns them in rows and feeds them into the pockets of boards or trays 22 (see FIG. 5) which travel continuously at even speed with spaces between boards on a forwarding chain conveyor 23. Excess tiles are swept off by an oblique brush 24 to a return belt conveyor 25 which replaces them on the conveyor 20.

From the conveyor 23 the filled trays or boards 22 pass to a conveyor 26 where they are precisely arranged in the pockets of the boards and where after rearrangement, an adhesive backing sheet is applied to the tiles.

Up to this point the boards travel endwise. After the backing sheet has been applied a low level conveyor 27 carries the boards, still travelling endwise, to a turntable 28 which first raises them above a wide-gage high-level conveyor 29, then turns them a quarter turn (90°), then lowers them down upon the conveyor 29 for sidewise travel to a conveyor 30 which carries them sidewise and closer together at a slower speed through a heated drying chamber or oven 31.

A cross conveyor 32 carries the boards from the oven 31 to a cooling chamber 33 through which they are carried by a conveyor 34. A wide-gage high-level conveyor 35 carries the boards from the cooling chamber 33 to a turntable 36 which raises them, gives them a quarter turn, then lowers them down upon a narrow-gage conveyor 37 which moves them endwise and spaced apart to a roller table conveyor 38.

On the roller table conveyor 38 the boards can accumulate and are pushed along by hand to a return belt conveyor 39.

The boards are transferred, as required by the forwarding chain conveyor 23, from the return or supply conveyor 39 to the conveyor 23 by a return cross conveyor 40 which forms the subject of the present invention.

The operations are largely automatic but operators may be used at an inspection station 41, a backing sheet applying station 42, and a delivery station 43.

As shown in FIG. 1, the chains of the board return or supply conveyor 39 pass over sprockets 50 on a shaft 51 at the board receiving end and over drive sprockets 52 on a shaft 53 at the delivery end.

As shown in FIGS. 2 to 5, the shaft 53 by a sprocket 54 and a chain 55, is driven from the sprocket 56 of a shaft 57 of a gear box 58 driven by a motor M. As shown in FIGS. 4 and 5, the motor and gear box are mounted on a base 59 which is movable along a guide base 60 and held in position by cap screws 61 in slots 62 of the base. An adjustment screw 63 moves the base 59 along its guide base 60 to adjust the tension in the chain 55.

The motor M is driven upon demand from the cross conveyor unit 40 by means to be described. As shown in FIG. 5, the boards 22 are disposed end-to-end on the return or supply conveyor 39. The conveyor 39 has side guide rails 44 for guiding boards 22 as they move along.

As shown in FIG. 2, the receiving end of the cross conveyor unit 40 has a roller table conveyor 67 at the end of the longitudinal return conveyor 39 to receive one tile board at a time. The board is pushed upon the roller table conveyor 67 by the action of the conveyor 39. The boards stop against a side rail 68 of the conveyor unit 40. FIG. 5 shows a tile board 22 pushed over upon the roller table conveyor 67. A limit switch S1 carried at the side stop rail 68 acts through suitable controls to stop the feed of conveyor 39 when a board is pushed against the side rail 68.

The cross conveyor unit 40 includes conveyor chains 70 passing over sprockets 71 on a shaft 72 at the receiving end and passing over sprockets 73 of a shaft 74 at the delivery end.

At the delivery end of the cross conveyor chains 70 and in line with the forwarding conveyor 23 there is arranged a roller table conveyor 75 which has an overlap with the end of the chains of conveyor 23, the tops of the rollers of the table conveyor being slightly higher than the top of the chains, as shown in FIG. 9. The chains of conveyor 23 at the starting end pass over sprockets 76 on a shaft 77. Side guide stop rollers 78 are provided on a stop rail 79 to halt the side movement of boards and to aid their forward feed, and a side guide rail 80 is provided along the conveyor 23 for the boards.

As shown in FIGS. 6, 7 and 8, the chains 70 of the cross conveyor unit 40 are provided with bracket-carried rollers 81 for engaging behind the sides of boards to push them along. As shown in FIG. 9, the chains of conveyor 23 are provided with projections 82 which engage depending adjustable projections 83 carried beneath the boards 22.

As shown in FIGS. 3 and 6, the chains 70 of the cross conveyor 40 pass over sprockets 84 of an adjustment shaft 85 which is mounted in bearings in a base 86 which is adjustable along a support 87 by an adjustment screw 88 and held in adjusted position by clamping cap screws 89 positioned in slots in the base 86. The shaft 85 is provided with an end sprocket 90 (FIG. 2) driven by a chain 91 from a sprocket 92 of a drive shaft 93.

As shown in FIGS. 2 and 3, a power shaft 100 driven by a prime mover, not shown, carries a sprocket 101 which drives a chain 102 which at its other end is carried by an idler sprocket 103 of a shaft 104 which is mounted on an adjustable support arm 105. Intermediate its ends, one span of the chain 102 passes over a sprocket 106 of a clutch 107 (FIG. 9) of a drive shaft 108. The shaft 108 is connected by a flexible coupling 109 to a drive shaft 110 of a quick-motion conveyor drive gear mechanism 111.

The action of the board feed mechanism is timed (FIG. 9) by the conveyor 23, one of the chains of which passes over a sprocket 115 on a shaft 116 which carries a timing cam 117. The cam 117 operates a cam follower roller 118 of an arm 119 mounted on a swing member 120 turnable about pivot means 121 of a fixed support 122 on the main frame. Another arm 123 of the member 120 is adapted to engage a pin 124 of the clutch 107 to engage and disengage it at proper times to drive and stop the shaft 108.

The quick-motion conveyor drive mechanism 111 is shown in FIGS. 10 to 14. It is designed to move the chains 70 of conveyor 40 rapidly but with a gradual start and a gradual stop to carry one tile board 22 over upon the roller table conveyor 75 in position for the chains of conveyor 23 to entrain it and move it forward.

The quick-motion drive is a combination epicyclic and crank-pin-and-slot type which gives balanced smooth motion. The shaft 110 extends through the hub of a fixed sun gear 127 and has rigidly secured to it a rotary member 128 on which are rotatably mounted crank shafts 129. Each crank shaft carries a planetary gear 130 which meshes with the fixed sun gear and a crank shaft 131 carrying a crank pin 132 with a roller 133 thereon.

The rollers 133 of the crankpins operate in radial slots 134 formed between guides 135 of a rotary member 136 carried by the shaft 93 previously referred to as carrying the drive sprocket 92 for the conveyor chains 70. The shaft 93 is tubular and turns on bearings 137 on the shaft 110 as well as within a bearing 138 of the casing 139 of the gear mechanism 111.

Figure 14:
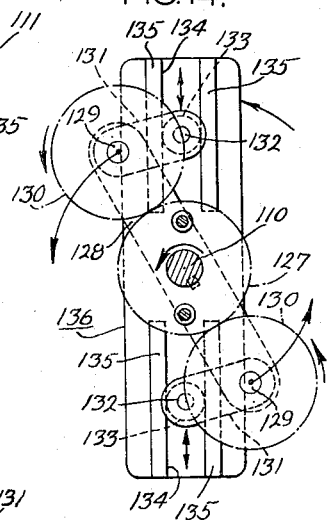
FIG. 14 is a diagrammatic view to show the action of the mechanism shown in FIGS. 10 to 13.

FIGS. 10 to 13 show the quick-motion mechanism in an intermediate position for clarity of illustration. FIG. 14 is an operating diagram to show the action. The drive is so designed and coordinated that the crank shafts 129 make a half revolution each time a tile board is fed over.

Starting from a rest position where the crank pins are located intermediate the ends of the slots 134 and the cranks 131 disposed approximately at right angles to the slots, the first movement of the crank pins is generally along the length of the slots with a gradually increasing action on the side guides of the slots to start the member 136 gradually into turning movement. This starts the conveyor chains 70 with the tile boards thereon into gradually accelerated movement.

When the crank pins 132 reach the position shown in FIGS. 10 to 13 they are moving approximately at right angles to the slots 134 and the rotary speed of the member 136 is a maximum. This is the mid position in the travel of a tile board from a rest position to a final position on the roller table conveyor 75.

For the remainder of their movement the crank pins 132 move the rotary member 136 with decelerated speed to stop the tile board gently in its final position. During one stroke each crank pin has moved out to one end and back to the center of its slot with the crank arm coming to rest at right angles to the slot but on the other side from that at which it started.

On the next stroke the crank pin will move out and back along the other end or half length of the slot.

The operation of the apparatus as a whole will now be apparent. Assuming that a tile board has just been fed to the forwarding conveyor 23, the last board on the cross conveyor 40 will release the arm of switch S1 as its trailing edge passes the switch arm. This will actuate the switch to energize motor M of the drive for the return or supply conveyor 39 to feed down another board. When the front end of the board comes to a stop against the stop rail 68 and actuates the switch S1, the motor M will be de-energized and the movement of the conveyor 39 halted. There will be enough free movement between one end of the infed board and the stop rail 68 on the one hand and between the other end of the infed board and the end of the next oncoming board on the conveyor 39 on the other hand to allow the infed board to move over when the conveyor 40 next operates. Specifically, the side guide rails 44 prevent the next board on the conveyor 39 from being moved laterally when the end board on conveyor 40 is moved over laterally by that conveyor, even though the ends of the boards may be in engagement due to the fact that the conveyor 39 feeds boards in end-to-end relationship, as shown in FIG. 5. The chains of conveyor 39 can slip beneath the boards if there is any overtravel after the end board is stopped. Conveyor 23, by the interengagement of a projection 82 thereof with the projection 83 of a board, will move forward the last-fed board, the rollers 78 and side guide 80 guiding the board as it moves forward.

At the proper time in the movement of the conveyor 23, in the space between board positions thereon, the cam 117, which is operated by the conveyor 23, will operate the clutch 107 to cause power shaft 110 to turn. This, as has been seen, operates the quick-motion device and the chains 70 of conveyor 40 to feed in another board. It will be noted from FIG. 6 that the bracket-carried rollers 81 of conveyor 40 engage the sides of boards to move them positively. First, a board is pushed off the high rollers of the table 67 and drops down on the chains of the conveyor 40 and, by several intermittent movements, it reaches the other end of the conveyor 40; whereupon, in the next movement of the conveyor 40, it is moved up on the high rollers of the roller table conveyor 75 above the chains of conveyor 23. The impetus of the board, once it is on the rollers of conveyor 75, cause it to leave the pusher rolls 81 of conveyor 40 and to move over against the side guide rolls 78 of the table conveyor 75. The board will be moved forward by conveyor 23 when the next projection 82 of the conveyor 23 comes along, as shown in FIG. 9.

It is thus seen that the invention provides convenient, efficient and dependable means for transferring tile boards to a forwarding conveyor in accurate position for tiles to be assembled in the pockets of the boards.

While one embodiment of the invention has been described for purposes of illustration, it is to be understood that there may be various embodiments and modifications within the general scope of the invention.

I claim:
1. Board transfer apparatus, comprising in combination, a horizontal board return or supply conveyor, power means for driving said return conveyor to deliver boards off the delivery end thereof, a continuously moving horizontal board forwarding conveyor provided with spaced board engaging means, and means for transferring boards delivered from said return conveyor to said forwarding conveyor in position to be engaged by said board engaging means thereon, said means for transferring boards comprising an endless horizontal chain cross transfer conveyor having its receiving end located in position to receive boards delivered by said return conveyor and its delivery end located in position to deliver boards to said forwarding conveyor, means operated in timed relationship with the continuous movement of said forwarding conveyor for operating said transfer conveyor to deliver a board to said forwarding conveyor and stop for each board-engaging means on said forwarding conveyor, means responsive to the presence of a board at the receiving end of said transfer conveyor for halting the movement of said return conveyor until said board is fed away from receiving position by said transfer conveyor, a first elevated table above the receiving end of said cross transfer conveyor for holding a board above the chains of the transfer conveyor, spaced raised means on said cross transfer conveyor adapted to engage a board and push it off said first elevated table and upon said transfer conveyor, and a second elevated table above said forwarding conveyor and beyond the end of said transfer conveyor for receiving a board when pushed up thereon by said spaced raised means of said transfer conveyor.

2. Board transfer apparatus as set forth in claim 1, in which said means for halting the movement of said return conveyor comprises a stop rail for the advance end of a board being pushed by said return conveyor on said first elevated table, and a power control element at said stop rail which is actuated by the advance end of a board.

3. Board transfer apparatus as set forth in claim 1, which further includes in combination, stop means for the boards delivered upon said second elevated table to the forwarding conveyor, comprising rollers aligned to turn with the forward movement of a board on said forwarding conveyor.

4. Board transfer apparatus, comprising in combination, a continuously moving board forwarding conveyor provided with spaced board engaging means, a transfer conveyor having its delivery end located in position to deliver boards to said forwarding conveyor, and means operated in timed relationship with the continuous movement of said forwarding conveyor for operating said transfer conveyor to deliver boards at correct intervals of time to occupy correctly spaced positions on said forwarding conveyor, said last-mentioned time operating means for said transfer conveyor comprising a power drive shaft, a clutch for said shaft, a timing cam operated by said forwarding conveyor, means for operating said clutch by said cam, and quick-motion mechanism operated through said clutch when engaged to deliver one board to the forwarding conveyor and stop.

5. Board transfer apparatus as set forth in claim 4, in which said quick-motion means includes drive and driven elements which start the drive gradually from zero, increase the speed to a maximum at mid-point, and reduce gradually to zero.

6. Board transfer apparatus, comprising in combination, a first or supply horizontal endless board conveyor supporting boards thereon and feeding them in end-to-end abutting relationship, power means for operating said first conveyor upon demand, a second or cross transfer horizontal endless board conveyor arranged transversely across the end of said first conveyor, an elevated table above the receiving end of said second conveyor which holds the board delivered thereon above the upper span of said second conveyor, raised spaced pusher elements on said second conveyor for engaging a board and pushing it down on the upper span of the second conveyor when it runs, control means engaged by a board on said table for halting the operation of said power means and said first conveyor when a board is pushed on the table by said first conveyor and means for holding the end board on said first conveyor against lateral movement when the board on said table is moved off by said second conveyor, said control means being effective when a board leaves said table for starting the operation of said power means and first conveyor to feed another board on said table.

7. Board transfer apparatus, comprising in combination, a first or cross transfer horizontal endless board conveyor, a second or forwarding horizontal endless board conveyor arranged transversely across the end of said first conveyor, an elevated table above said second conveyor which holds a board delivered thereon by said first conveyor above the upper span of said second conveyor, raised spaced pusher elements on said first conveyor which push a board from said first conveyor up on said table beyond the end of the first conveyor, raised spaced pusher elements on said second conveyor for moving a board off said table and down on said second conveyor, and means timed with the movements of the pusher elements of said second conveyor for controlling the operation of said first conveyor.

8. Apparatus as set forth in claim 7, in which said table is provided with rollers to ease the movement of a board thereon by inertia impetus, the board thereupon moving out of the range of a pusher element of said first conveyor.

9. Apparatus as set forth in claim 7, which further includes drive means for said first conveyor providing intermittent start and stop movement between periods of engagement of the pusher elements of the second conveyor with boards fed thereto, said drive means providing fast intermediate movement of said first conveyor with stoppage of travel between periods of movement.

References Cited by the Examiner
UNITED STATES PATENTS

| | | | |
|---|---|---|---|
| 1,355,488 | 10/20 | McKenny | 198—37 X |
| 1,901,928 | 3/33 | Olson | 198—21 |
| 1,977,307 | 10/34 | Hayssen | 198—37 X |
| 2,487,878 | 11/49 | Kantenwein | 193—36 |

SAMUEL F. COLEMAN, *Primary Examiner.*

EDWARD A. SROKA, *Examiner.*